US011343980B2

(12) United States Patent
Osterchill et al.

(10) Patent No.: US 11,343,980 B2
(45) Date of Patent: May 31, 2022

(54) COLLAPSIBLE BLOWER EXTENSION

(71) Applicant: Husqvarna AB, Huskvarna (SE)

(72) Inventors: Jeff Osterchill, Davidson, NC (US); Andrew Curtis, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 223 days.

(21) Appl. No.: 16/722,006

(22) Filed: Dec. 20, 2019

(65) Prior Publication Data

US 2021/0185944 A1 Jun. 24, 2021

(51) Int. Cl.
*A01G 20/47* (2018.01)
*B08B 5/02* (2006.01)

(52) U.S. Cl.
CPC ............... *A01G 20/47* (2018.02); *B08B 5/02* (2013.01)

(58) Field of Classification Search
CPC .................................. A01G 20/47; B08B 5/02
See application file for complete search history.

(56) References Cited

U.S. PATENT DOCUMENTS

| 5,584,436 A * | 12/1996 | Sepke ........................ A47L 5/14 15/414 |
| 6,210,270 B1 | 4/2001 | Niksic et al. |
| 2004/0216269 A1* | 11/2004 | Slawinski ................. A47L 9/08 15/415.1 |
| 2007/0072690 A1* | 3/2007 | Berenson ............... A63G 21/18 472/117 |
| 2008/0279720 A1* | 11/2008 | Meilander ............... A61L 2/208 422/29 |
| 2018/0092498 A1* | 4/2018 | Mata ........................ A47L 9/009 |
| 2019/0053441 A1 | 2/2019 | Harvey et al. |
| 2020/0149668 A1* | 5/2020 | Mason ..................... F16L 27/12 |

FOREIGN PATENT DOCUMENTS

CN 102296555 B 5/2015
JP 3519021 B2 4/2004

\* cited by examiner

*Primary Examiner* — Marc Carlson
(74) *Attorney, Agent, or Firm* — Burr & Forman LLP

(57) ABSTRACT

An example collapsible blower extension for a leaf blower is provided. The collapsible blower extension may include an elongate body forming an internal airflow passageway. The elongate body may be formed of a pliable material causing the internal airflow passageway to be collapsible. The collapsible blower extension may also include an input opening at a proximal end of the elongate body configured to be disposed proximate a leaf blower working assembly airflow outlet and an output opening at a distal end of the elongate body.

15 Claims, 11 Drawing Sheets

COLLAPSIBLE BLOWER EXTENSION

TECHNICAL FIELD

Example embodiments generally relate to accessories for outdoor power equipment and, more particularly, relate to apparatuses associated with accessories for blowers to direct airflow.

BACKGROUND

Leaf blowers have become a common outdoor power tool for use in both commercial and consumer contexts. A typical hand-held leaf blower includes a motor-driven fan or impeller that generates a high-speed airflow to blow leaves and yard clippings off of hard surfaces (e.g., roads, sidewalks, driveways, etc.) or into piles. To focus and direct the airflow at a distance away from the user, conventional leaf blowers include a hard plastic tube that extends from an outlet on the impeller housing. While such a plastic blower tube or extension is effective for focusing and directing the airflow, such a tube has disadvantages. For example, these blower tubes add to the length of a hand-held leaf blower when not in use, causing the leaf blower to take up substantial storage space in a garage or on a work truck. In some instances, to alleviate such size issues, conventional blower tubes can be detached from the impeller housing, sometimes in pieces, to lessen the required storage space. However, such removable tubes and tube pieces can be misplaced and require additional time for assembly and disassembly. As such, there is a need for improvements to leaf blowers and leaf blower tubes to address some of these disadvantages.

BRIEF SUMMARY OF SOME EXAMPLES

According to some example embodiments, a leaf blower is provided. The example leaf blower may include a working assembly comprising a motor and an impeller. The motor being operably coupled to the impeller to rotate the impeller and generate an airflow through a working assembly airflow outlet. The example leaf blower further comprising a collapsible blower extension operably coupled to the outlet of the working assembly. The collapsible blower extension may comprise an elongate body forming an internal airflow passageway having an input opening at a proximal end of the elongate body, proximate the working assembly airflow outlet, and an output opening at a distal end of the elongate body. The elongate body may be formed of a pliable material causing the internal airflow passageway to be collapsible.

According to some example embodiments, a collapsible blower extension for a leaf blower is provided. The collapsible blower extension may comprise an elongate body forming an internal airflow passageway. The elongate body may be formed of a pliable material causing the internal airflow passageway to be collapsible. The collapsible blower extension may further comprise an input opening at a proximal end of the elongate body configured to be disposed proximate a leaf blower working assembly airflow outlet, and an output opening at a distal end of the elongate body.

According to some example embodiments, a method for implementing a collapsible blower extension is provided. The example method may comprise collapsing the collapsible blower extension of a leaf blower that is operably coupled to a working assembly airflow outlet of the leaf blower. The collapsible blower extension may comprise an elongate body forming an internal airflow passageway having an input opening at a proximal end of the elongate body proximate the working assembly airflow outlet and an output opening at a distal end of the elongate body. Further, the elongate body may be formed of a pliable material. The example method may further comprise generating, by the leaf blower, an airflow from the working assembly airflow outlet into the input opening of the internal airflow passageway to create an internal air pressure within the internal airflow passageway to transition the collapsible blower extension from a collapsed state to an expanded state.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 8A:
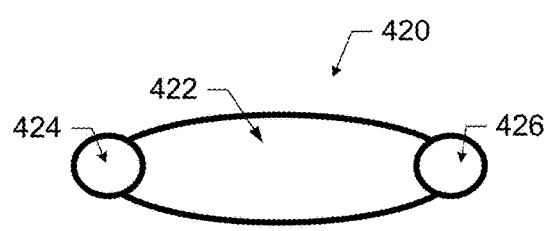
Figure 8B:
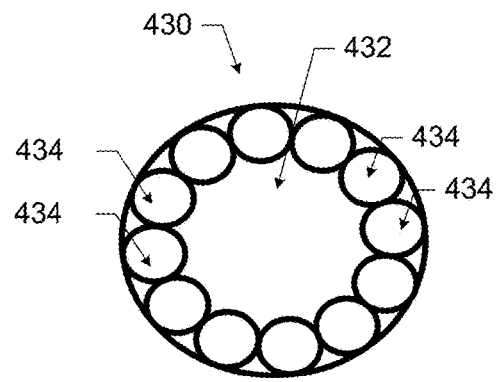
Figure 8C:
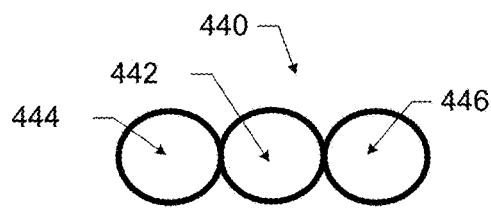
Figure 9A:
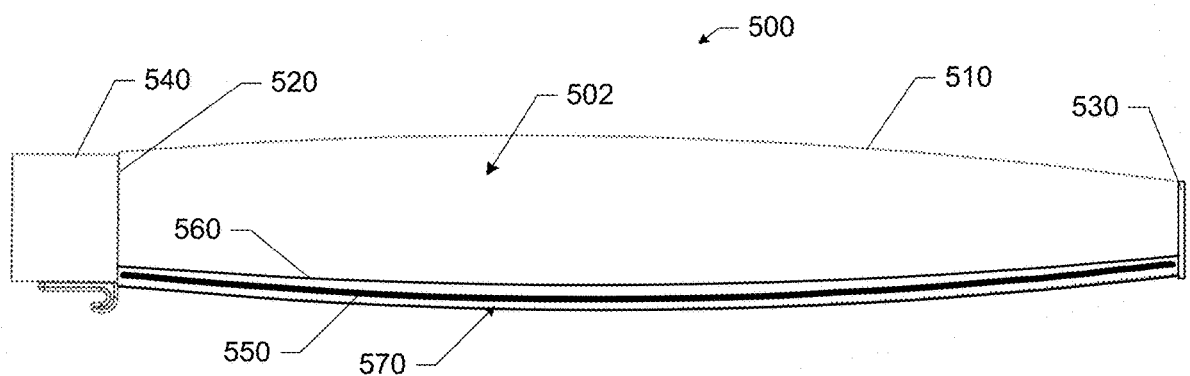
Figure 9B:
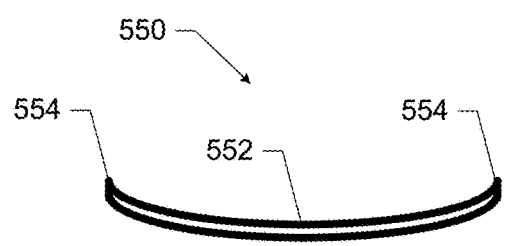
Figure 9C:
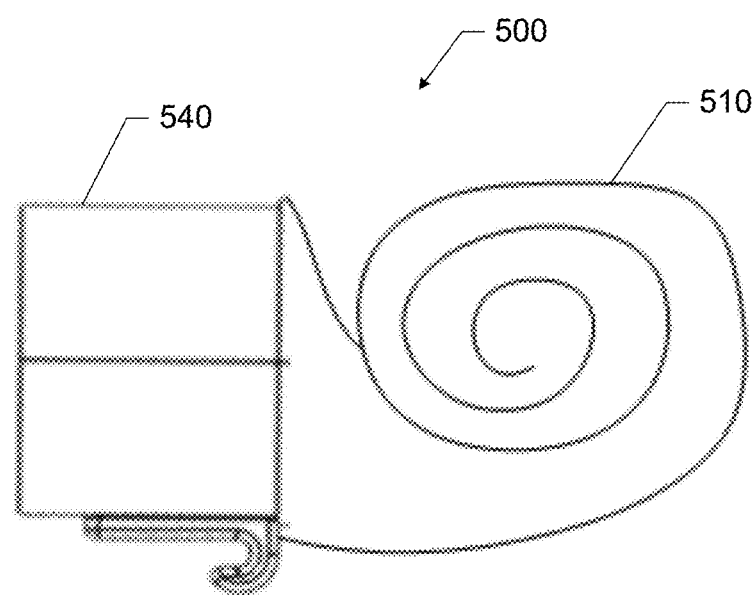
Figure 10A:
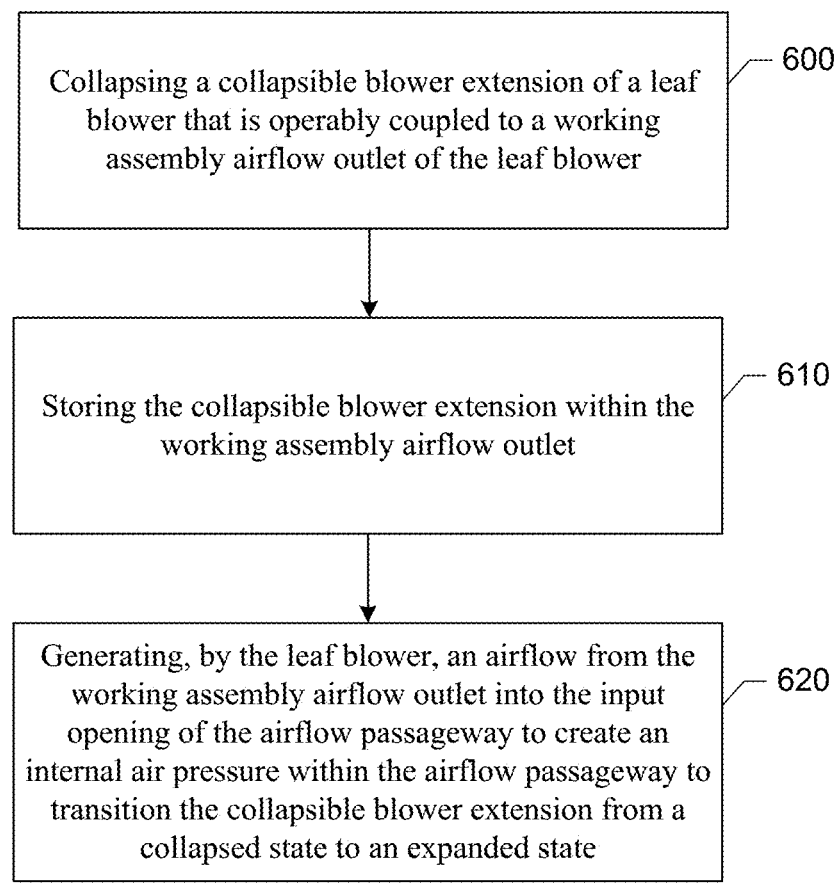
Figure 10B:
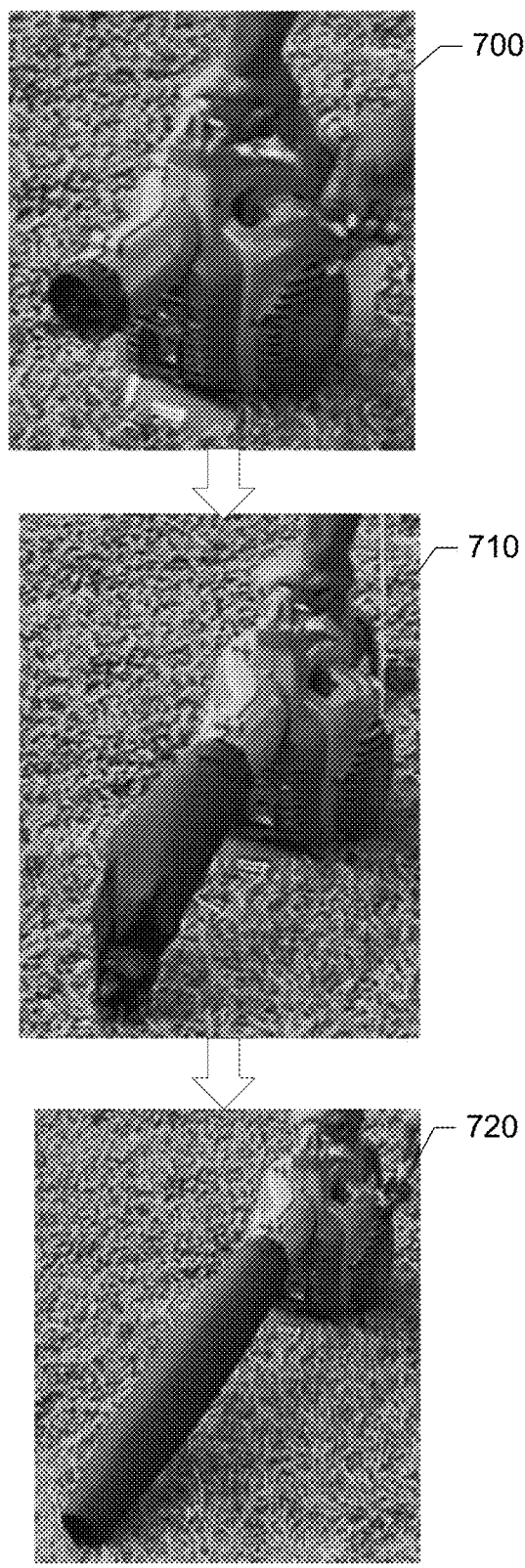

FIGS. 8A, 8B, and 8C illustrate example cross-sectional front views of respective example elongate bodies of example collapsible blower extensions with secondary internal airflow passageways according to some example embodiments;

FIG. 9A illustrates a cross-sectional side view of an example collapsible blower extension in an expanded state with an auto-storage feature according to some example embodiments;

FIG. 9B illustrates a cross-sectional transverse view of an example spring member for an auto-storage feature according to some example embodiments;

FIG. 9C illustrates a cross-sectional side view of an example collapsible blower extension in a collapsed state with an auto-storage feature according to some example embodiments;

FIG. 10A illustrates a flowchart of an example method of implementing a collapsible blower extension according to some example embodiments;

FIG. 10B illustrates an image flow an example collapsible blower extension transitioning from a collapsed state to an expanded state according to some example embodiments.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A. As used herein, operable coupling should be understood to relate to direct or indirect connection that, in either case, enables functional interconnection of components that are operably coupled to each other.

According to some example embodiments, a leaf blower with an improved blower extension is provided, where the blower extension is collapsible and can realize a number of advantages such as, for example, lessening the space needed to store a hand-held leaf blower when not in use and without having to detach components from the leaf blower to do so. In this regard, a collapsible blower extension, according to some example embodiments, may be formed of a pliable material such as a fabric or latex material. The pliable material may be sewn or otherwise formed to have a tube-like shaped elongate body with an internal airflow passageway. However, due to the pliable characteristic of the material, the internal airflow passageway may collapse when forces are not present to maintain the internal airflow passageway in an inflated or expanded state. The airflow provided by a motor-driven impeller of a leaf blower may be directed into the internal airflow passageway of the collapsible blower extension body to provide an air pressure to inflate or expand the internal airflow passageway from a collapsed state to an expanded state. In the expanded state, airflow from the impeller outlet of the leaf blower can pass through internal airflow passageway to an outlet opening in the collapsible blower extension. The airflow passing out of the outlet opening of the collapsible blower extension may focused and directed to permit the user of the hand-held blower to direct the airflow towards, for example, fallen leaves or lawn clippings at a distance away from the user and the motor housing of the leaf blower. When the airflow is not provided, the collapsible blower extension may no longer be expanded and the elongate body may deflate into a collapsed state. Further, because the elongate body of the collapsible blower extension is made of a pliable material, the collapsible blower extension may be bunched, rolled, stuffed, or the like for storage, for example, within the impeller outlet when the collapsible blower extension is in the collapsed state. Accordingly, when the leaf blower is not in use, the collapsibility of the blower extension can cause the overall size of the leaf blower to be reduced and allow for more compact storage of the leaf blower without having to remove the blower extension from the leaf blower.

Figure 1A:
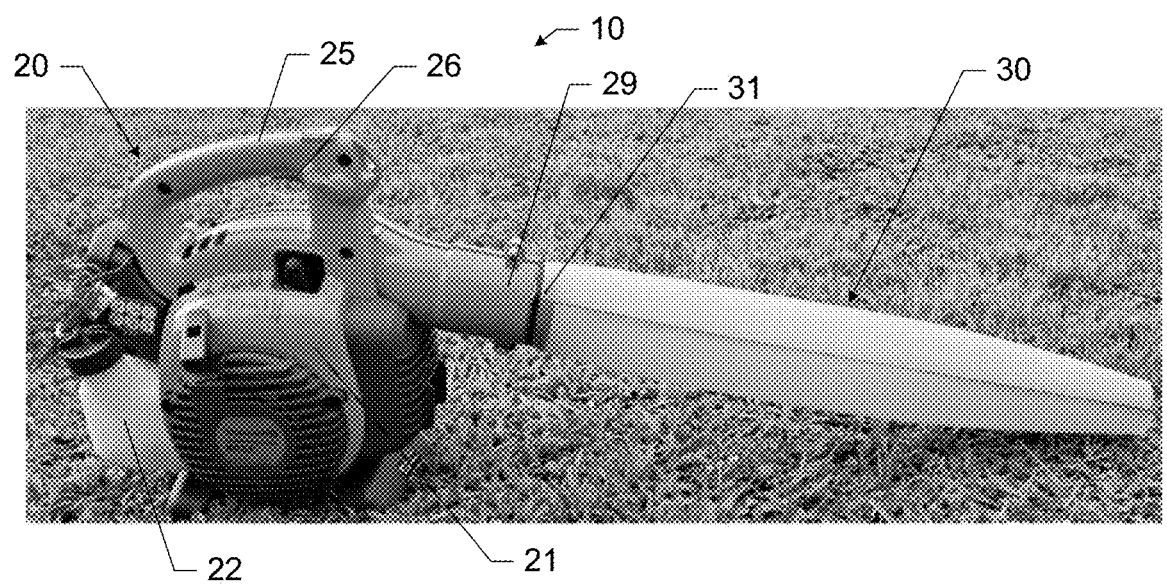
FIG. 1A illustrates an example leaf blower with a collapsible blower extension in an expanded state according to some example embodiments.
Figure 1B:
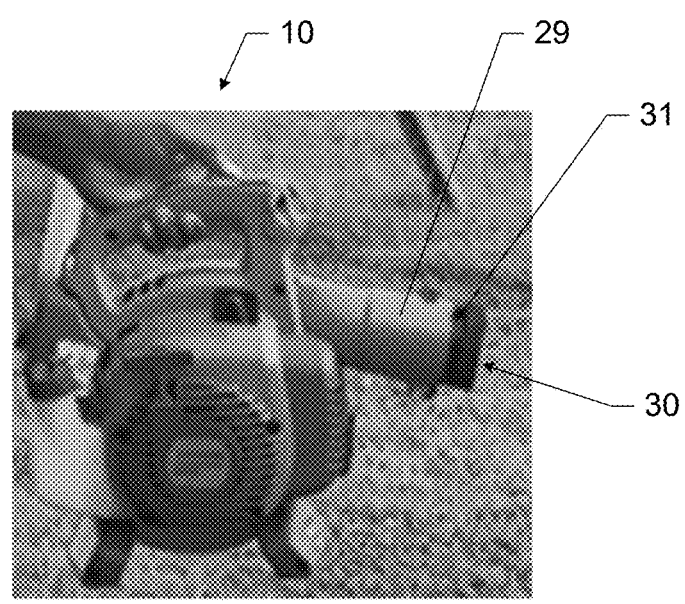
FIG. 1B illustrates an example leaf blower with a collapsible blower extension in a collapsed state and stored according to some example embodiments.
Figure 1C:
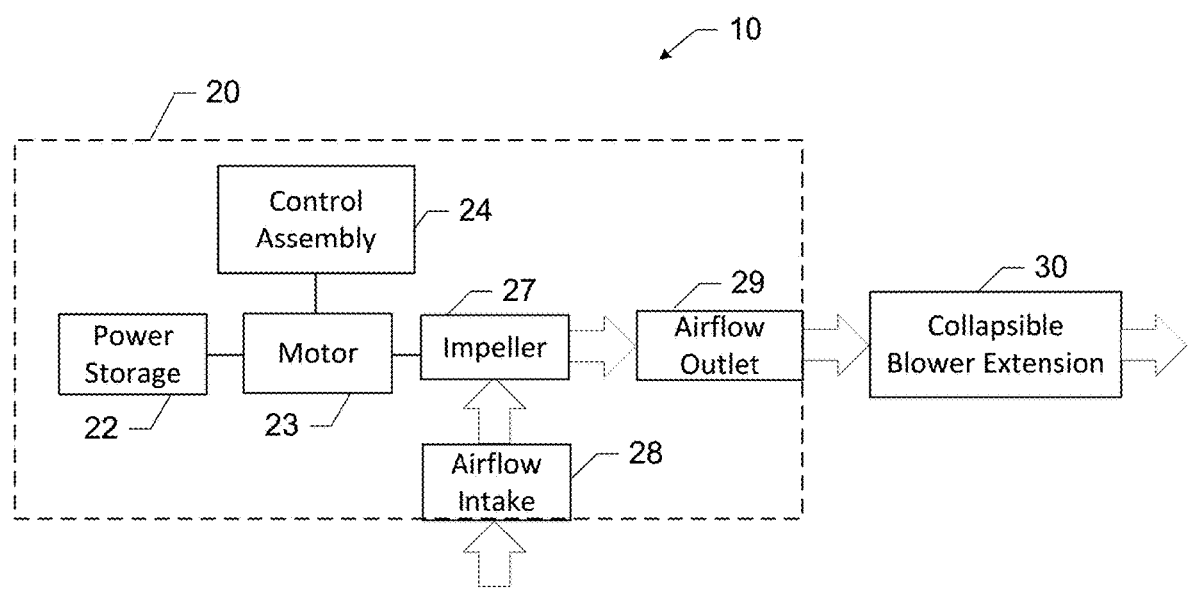
FIG. 1C illustrates a functional block diagram of an example leaf blower with a collapsible blower extension according to some example embodiments.

FIGS. 1A, 1B, and 1C illustrate an example leaf blower 10 according to some example embodiments. FIG. 1A is an image of the example leaf blower 10 illustrating various external components of the leaf blower 10 with a collapsible blower extension 30 in an expanded state. FIG. 1B is another image of the example leaf blower 10, however, with the collapsible blower extension 30 in a collapsed state and inserted into, and therefore stored within, an airflow outlet 29 of a working assembly 20 of the leaf blower 10. FIG. 1C is a functional block diagram of some components of the leaf blower 10 including internal components not visible in FIGS. 1A and 1B. In this regard, the leaf blower 10 may be comprised of a working assembly 20 and the collapsible blower extension 30.

The working assembly 20 may be configured to generate a high-speed output airflow to be directed by the collapsible blower extension 30 at a distance away from a user and closer to an object to be acted upon by the airflow (e.g., leaves, lawn clippings, etc.). The working assembly 20 may comprise a housing 21, a power storage 22, a motor 23, a control assembly 24, an impeller 27, an airflow intake 28, and an airflow outlet 29. The control assembly 24 may comprise a number of components as further described below, including a handle 25 and a control switch 26.

The housing 21 may enclose or otherwise mechanically support the components of the working assembly 20. In this regard, the motor 23 and the impeller 27 may be disposed within the housing 21. The housing 21 may also mechanically support the power storage 22. In addition, the housing 21 may support or enclose a pull starter in example embodiments where the motor 23 is an internal combustion engine.

According to some example embodiments, the motor 23 of the working assembly 20 may be an internal combustion engine, an electric motor, or the like. The motor 23 may be powered via the power storage 22. According to some example embodiments, the power storage 22 may be a gas tank (as shown in FIG. 1), a battery (e.g., rechargeable battery), or the like. Using energy from the power storage 22, the motor 23 may be configured to rotate a motor shaft. The motor 23, and more specifically the motor shaft of the motor 23, may be operatively coupled to the impeller 27 to rotate the impeller 27. In this regard, the motor 23 may be operatively coupled to an impeller 27, which may, for example, be a fan or the like. In this regard, the impeller 27 may convert the physical rotation of the impeller 27 into an airflow, due to the operation of, for example, fins, blades, or the like of the impeller 27. In other words, rotation of the impeller 27, as driven by the motor 23, may generate an airflow through the working assembly airflow outlet 29.

Accordingly, the motor 23 may be configured to rotate the impeller 27 at a high rate to cause the impeller 27 to generate an output airflow. The airflow may originate from an airflow intake 28, accelerate the air as the air passes through and is acted upon by the impeller 27, and be forced out of the working assembly 20 via the airflow outlet 29. The airflow outlet 29 may include coupling features to permit the collapsible blower extension 30 to be temporarily or permanently affixed to the airflow outlet 29 such that the airflow exiting the airflow outlet 29 passes through the collapsible blower extension 30.

The control assembly 24 may include a user interface with mechanical or electronic control inputs for the leaf blower 10. The control assembly 24 may include mechanical controls, such as, for example, the handle 25, which permits a user grasp the leaf blower 10 to transport and maneuver the leaf blower 10, for example, during use. Further, the control assembly 24 may, according to some example embodiments, include a control switch 26 that may be formed as, for example, a variable switch. In this regard, the control switch 26 may be configured to control the rate or quantity of energy (e.g., a gas/air mixture) provided to the motor 23, and thus control the velocity of the airflow exiting the airflow outlet 29. According to some example embodiments, the control switch 26 may be configured to control an amount of gasoline or petroleum fuel that is provided to the motor 23 by the power storage 22, where an increase in the provision of fuel increases the rotations per minute (RPM) of the motor 23 and thus the velocity of the airflow exiting the airflow outlet 29. According to some example embodiments, the control switch 26 may be configured to control a voltage or a frequency of a power signal provided to the motor 23, which may control the revolutions per minute of the motor 23 and thus the velocity of the airflow exiting the airflow outlet 29.

According to some example embodiments, the collapsible blower extension 30 may be operatively coupled via a coupler 31 to the airflow outlet 29 of the working assembly 20. The collapsible blower extension 30, when inflated as shown in FIG. 1A into an expanded state, may be used to direct the airflow from the airflow outlet 29 in a desired direction, at a distance (based on a length of the collapsible blower extension 30) away from the airflow outlet 29. When the collapsible blower extension 30 is not subjected to an airflow exiting the airflow outlet 29, the collapsible blower extension 30 may deflate or collapse into a collapsed state and, according to some example embodiments, may be stored in the airflow outlet 29 as shown in FIG. 1B.

Figure 2:
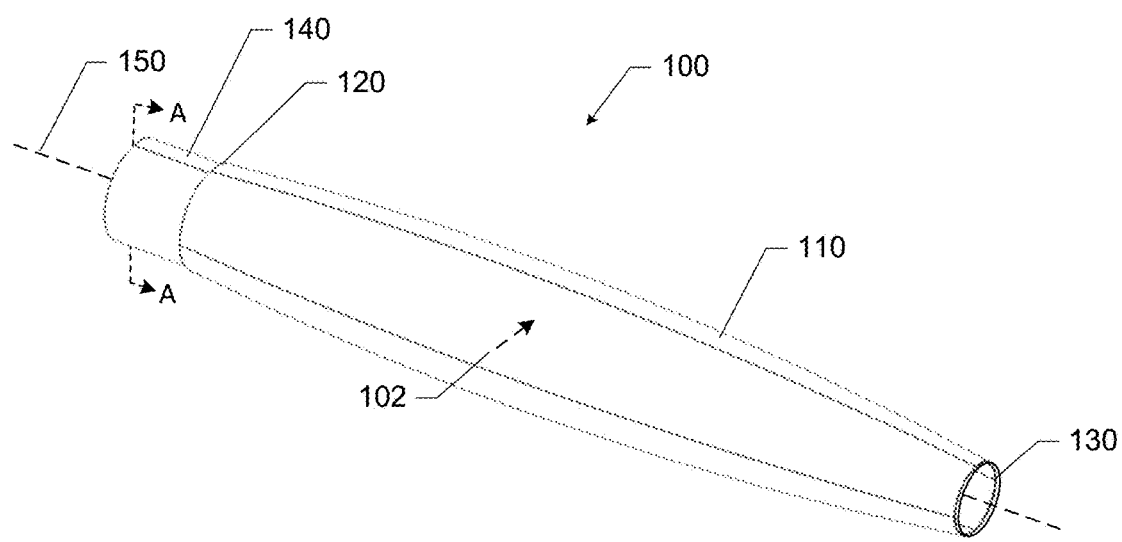
FIG. 2 illustrates an example collapsible blower extension in an expanded state according to some example embodiments.

FIG. 2 illustrates an example embodiment of a collapsible blower extension 100, in isolation, which is now described in further detail. The collapsible blower extension 100 may be the same or similar to the collapsible blower extension 30. Again, the collapsible blower extension 100 as provided in FIG. 2, is shown in the expanded state. The blower extension 100 may comprise an elongate body 110, an input opening 120, an output opening 130, and a coupler 140. For reference, the coupler 140 may be at or adjacent to a proximate end of the blower extension 100 (that is adjacent the airflow outlet 29 when the collapsible blower extension 100 is operably coupled to the working assembly 20) and the output opening 130 may be at or adjacent to a distal end of the blower extension 100.

As mentioned above, the elongate body 110 may be formed of a pliable material that allows for the elongate body 110 to inflate into an expanded state and deflate into a collapsed state. In the expanded state, the elongate body 110 may define an internal airflow passageway 102. According to some example embodiments, the pliable material may have a low or no air permeability to facilitate inflation of the elongate body 110. Further, according to some example embodiments, the pliable material may be a fabric, such as a woven fabric. In this regard, the fabric may be a woven nylon fabric such as a nylon ripstop fabric. According to some example embodiments, the pliable material may be a nonwoven material. For example, the pliable material may be a latex material, and in some example embodiments, the multiple layers of latex material may be used. In some example embodiments, the pliable material may be a thermoplastic copolyester (TPC).

The elongate body 110 may be formed by the pliable material into a tube-like shape between the input opening 120 and the output opening 130 thereby forming an internal airflow passageway disposed there between having an input opening 120 at a proximal end of the elongate body 110 and an output opening 130 at a distal end of the elongate body 110. The internal airflow passageway may also have an associated or corresponding tube-like shape. In this regard, the tube-like shape of the elongate body 110, as further described below, may be configured to form the internal airflow passageway between the ends of the elongate body 110 to allow airflow to exit the collapsible blower extension 100 via the output opening 130 when in the expanded state. Additionally, the tube-like shape may be configured to cause airflow entering the input opening 120 of the elongate body 110 to create an internal air pressure within the internal airflow passageway 102 against the internal walls of the collapsible blower extension 100 to maintain the internal airflow passageway 102 in the expanded state, when sufficient airflow is provided to the collapsible blower extension 100 by the airflow outlet 29 of the working assembly 20.

In this regard, according to some example embodiments, a sheet of the pliable material may be sewn into the tube-like shape to form the elongate body 110. According to some example embodiments, the pliable material may be molded or otherwise formed into the tube-like shape. The construction of the elongate body 110 may, according to some example embodiments, define a central axis 150 that extends longitudinally along a length of the elongate body 110 that passes through a center of a transverse cross-sectional area of the elongate body 110. In this regard, according to some example embodiments, the internal airflow passageway of the elongate body 110 may be symmetrical about the central axis 150 when the elongate body 110 is in the expanded state.

The coupler 140 may be an end of the pliable material of the elongate body 110, at or adjacent to the input opening 120, or the coupler 140 may be a separate component affixed to the end or input opening 120 of the elongate body 110. In this regard, the coupler 140 may be formed, for example, of a molded plastic or other rigid material. Further, the coupler 140 may be formed in the shape of an open cylinder or bushing that may include features for temporarily or permanently affixing the collapsible blower extension 100 to the airflow outlet 29 of the working assembly 20. In this regard, the coupler 140 and the airflow outlet 29 may have complementary components such as a post and channel, a hook and a catch opening, or other fastening means for affixing the collapsible blower extension 100 to the airflow outlet 29. In example embodiments where the coupler 140 is not an integral portion of the elongate body 110, the output opening 130 of the elongate body 110 may be affixed to (e.g., clamped onto) the coupler 140 at a distal end of the control circuitry 32 (i.e., at the end of the coupler 140 opposite the end that engages with the airflow outlet 29 of the working assembly 20).

Additionally, according to some example embodiments, the input opening 120 or the output opening 130 of the elongate body 110 may include components in addition to merely being the ends of the pliable material. For example, either or both of the input opening 120 and the output opening 130 may include a rigid structure, e.g., a ring, that provides structural support to the respective end of the elongate body 110. In this regard, for example, a ring structure (possibly but not necessarily formed in a circular shape) may be sewn into the output opening 130 at the distal end of the elongate body 110 or sewn into the input opening 120 at the proximal end of the elongate body 110. Alternatively, the ring structure may be secured to the input opening 120 or the output opening 130 using a glue or epoxy, or may be affixed via other mechanical means such as clamped with fasteners. Such a ring structure may cause the output opening 130 or the input opening 120, respectively, to maintain a constant shape during inflation to the expanded state or during deflation to the collapsed state. According to some example embodiments, the inclusion of a ring structure at the output opening 130 may operate to reduce "flapping" that can occur while the elongate body 110 is transitioning between a collapsed state and the expanded state. Further, a structural ring at the input opening 120 may be used to facilitate attachment of the proximal end of the elongate body 110, at the input opening 120, to the coupler 140. Alternatively, such a structural ring that is sewn into the input opening 120, according to some example embodiments, may be a type of coupler 140.

Figure 3:
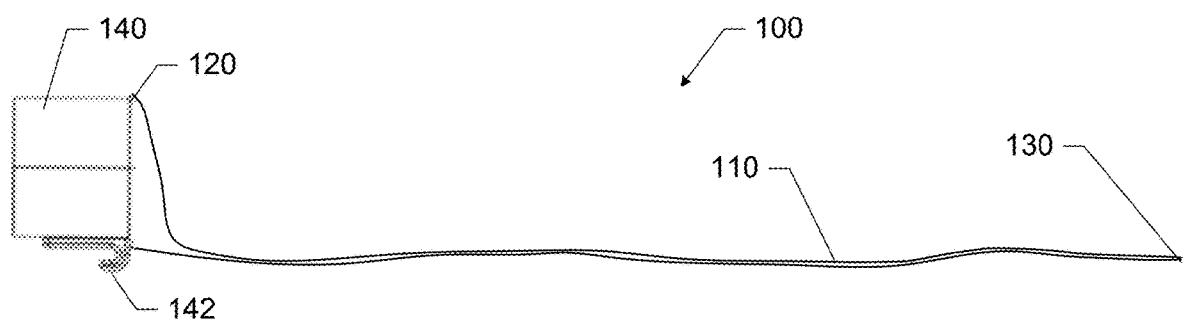
FIG. 3 illustrates an example collapsible blower extension in a collapsed state according to some example embodiments.

Referring now to FIG. 3, the collapsible blower extension 100 is shown in the collapsed state. Due to the pliable material of the elongate body 110 and a lack of airflow into the internal airflow passageway 102 of the elongate body 110, the walls of the elongate body 110 collapse upon themselves. In this collapsed state, the elongate body 110 may be bunched, rolled, stuffed or the like into airflow outlet 29 of the working assembly 20 for storage, when the collapsible blower extension 100 is attached to the working assembly 20. The collapsible blower extension 100 may be attached to the airflow outlet 29 of the working assembly 20 via the coupler 140, which, according to some example embodiments, may include the attachment hook 142 for interfacing with, for example, a complementary member or opening in the airflow outlet 29 for securing the collapsible blower extension 100 to the working assembly 20.

Figure 4A:
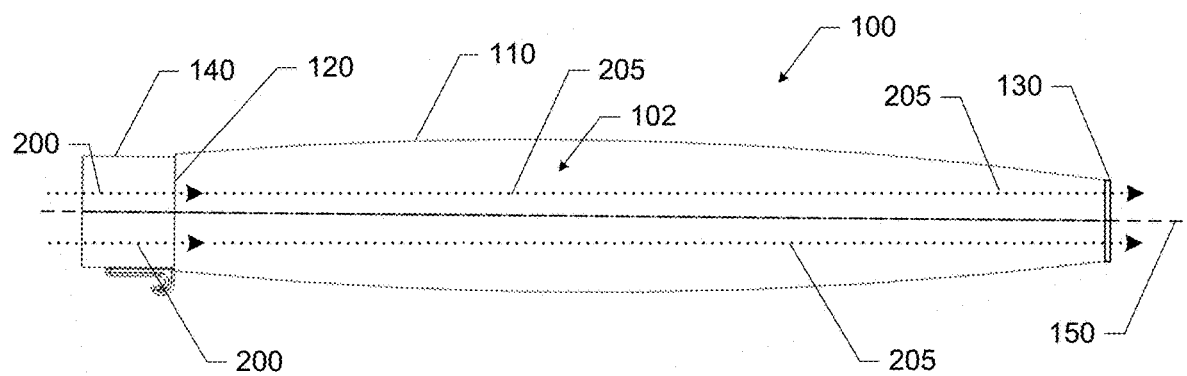
FIGS. 4A and 4B illustrate side cross-sectional view taken at A-A of FIG. 2 of an example collapsible blower extension in an expanded state with airflow indications according to some example embodiments.

Referring now to FIG. 4A, the collapsible blower extension 100 is shown in cross-section taken at A-A of FIG. 2, which is a longitudinal cross-section taken along the central axis 150. As shown in FIG. 4A, the elongate body 110 of the collapsible blower extension 100 includes the internal airflow passageway 102 that extends from the proximal end of the elongate body 110 at the input opening 120 to the distal end of the body at the output opening 130.

FIG. 4 also illustrates an airflow 200 entering the collapsible blower extension 100 that may have a component 205 that passes through the internal airflow passageway 102 of the elongate body 110 and exits the internal airflow passageway 102 via the output opening 130. The airflow 200 may be generated by the impeller 27 of the working assembly 20 and may pass through an airflow outlet 29 attached to the coupler 140. Due to the airflow 200, the internal airflow passageway 102 may be in the expanded state as shown in FIG. 4. The airflow 200 may enter the proximal end of the elongate body 110 at the input opening 120. At least a component 205 of the airflow 200 may pass through the internal airflow passageway 102 to the distal end of the elongate body 110 at the output opening 130 and exit the output opening 130. Accordingly, a component 205 of the airflow 200 may travel parallel to the central axis 150 longitudinally across a length of the collapsible blower extension 100 through the internal airflow passageway 102.

However, according to some example embodiments, if no component of the airflow 200 is directed towards the interior walls of the internal airflow passageway 102, the collapsible blower extension 100 may flap or flutter due to the pliable material used to form the elongate body 110. Now referring to FIG. 5, according to some example embodiments, the collapsible blower extension 100 may be shaped such that a component 210 of the airflow 200 may apply forces on the interior walls of the internal airflow passageway 102 to transition and maintain the internal airflow passageway 102 in the expanded state. In this regard, according to some example embodiments, the shape of the elongate body 110 may be configured to create an internal air pressure within the internal airflow passageway 102 due to the airflow 200 from the working assembly airflow outlet 29 to transition the internal airflow passageway 102 from a collapsed state to an expanded state.

The air pressure may be created by a component 210 of the airflow 200 that is perpendicular to the central axis 150 and directed towards the internal walls of the elongate body 110. To generate the component 210, according to some example embodiments, the shape of the internal airflow passageway 102 (and therefore the elongate body 110) may be defined to create turbulence within the internal airflow passageway 102 that causes an increased internal air pressure within the internal airflow passageway 102. This internal air pressure may generate forces across the length of the internal airflow passageway 102 of the elongate body 110 caused by the component 210 directed towards the interior walls of the elongate body 110. The force applied by the internal air pressure, as indicated by the components 210, may maintain the internal airflow passageway 102 and the elongate body 110 in the expanded state. Further, because, according to some example embodiments, the pliable material has a low or no air permeability, the airflow components 210 may not leak through the walls of elongate body 110 and may therefore operate to maintain the expanded state of the internal airflow passageway.

Figure 4B:
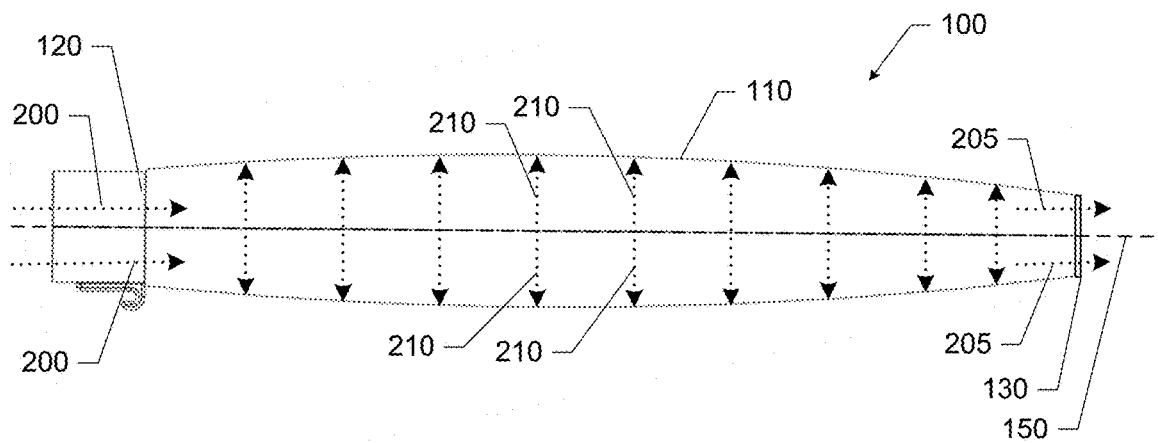

The elongate body 110 of the collapsible blower extension 100 may have a number of different shapes or internal features that may operate to create the airflow components 210, as well as the airflow components 205. As shown in FIG. 4B, according to some example embodiments, the tube-like shape of the elongate body 110 may be formed as an open-ended prolate spheroid (or an open-ended football shape). Because the walls of internal airflow passageway 102 of the elongate body 110 shaped as an open-ended prolate spheroid are not parallel, airflow 200 entering the internal airflow passageway 102 interacts with the internal walls of the elongate body 110 to create turbulence within the internal airflow passageway 102. This turbulence may be formed as air moves through the internal airflow passageway 102 thereby causing an increased internal air pressure force on the interior walls of the internal airflow passageway 102 (relative to the air pressure external to the elongate body 110) to maintain the elongate body 110 and the collapsible blower extension 100 in the expanded state.

Accordingly, the interior walls of the internal airflow passageway 102 of the elongate body 110 may have a concave curvature such that a maximum point 111 of the curvature (which may also be a minimum point of the curvature, depending on perspective) may be disposed between the ends of the internal airflow passageway 102. Accordingly, the exterior walls of the elongate body 110 may have a convex curvature according to some example embodiments. Further, according to some example embodiments, a shape of the internal airflow passageway 102 and the elongate body 110 may have bilateral symmetry about a cross-section, perpendicular to the axis 150 taken at point 111 (although this is not the case for the example elongate body 110 as shown in FIGS. 4A and 4B). Further, according to some example embodiments, a cross-section of the elongate body 110, taken perpendicular to the central axis 150, may have a circular shape.

Figure 5A:
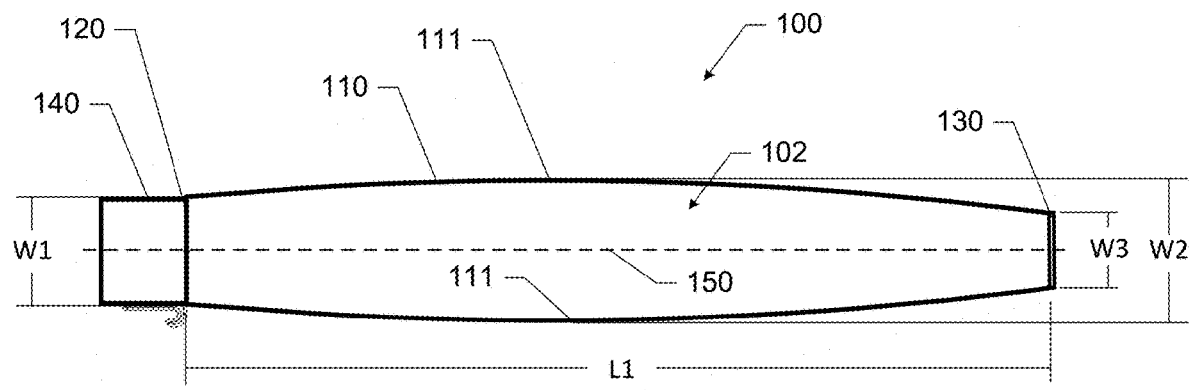
FIG. 5A illustrates a side cross-sectional view taken at A-A of FIG. 2 of an example collapsible blower extension in an expanded state with cross-sectional width measurements according to some example embodiments.
Figure 5B:
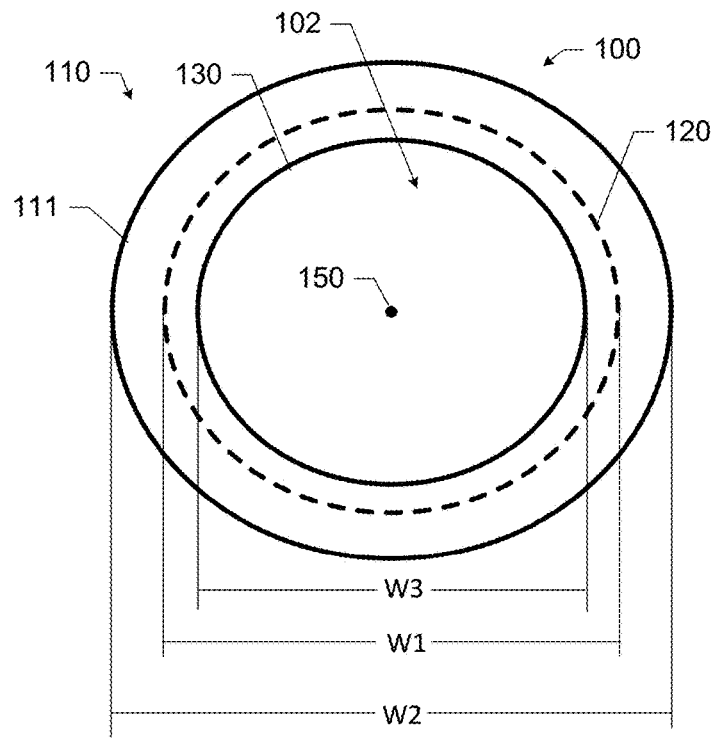
FIG. 5B illustrates a front view taken at a distal end of an example collapsible blower extension in an expanded state with cross-sectional width measurements according to some example embodiments.

To describe the relationships of the widths of the internal airflow passageway 102 across its length, which may contribute to the generation of the increased internal air pressure, reference will now be made to FIGS. 5A and 5B, both of which again show the collapsible blower extension 100. In this regard, because of the circular shapes of the cross-section of elongate body 110, the widths may be diameters of the circular cross-section at a respective location of the elongate body 110. In this regard, FIG. 5A illustrates another longitudinal cross-section view of the collapsible blower extension 100 and FIG. 5B illustrates a front view of the collapsible blower extension 100 looking into the distal end and the output opening 130 of the collapsible blower extension 100. As such, the relationships between the widths of the elongate body 110 and the internal airflow passageway 102 of the example collapsible blower extension 100 are shown with respect to the width measurements W1, W2, and W3 in FIGS. 5A and 5B.

According to some example embodiments, the elongate body 110 of the collapsible blower extension 100 may have a length L1 from the input opening 120 at the proximal end to output opening 130 at the distal end. Along this length L1, a width of the internal airflow passageway 102 of the elongate body 110 may vary. In other words, according to some example embodiments, a width of the internal airflow passageway 102 of the elongate body 110 may change (i.e., be non-constant) along its length. According to some example embodiments, a width of the internal airflow passageway 102 of the elongate body 110 between the proximal and distal ends of the elongate body 110 (e.g., W2) may be larger than the width W1 at the proximal end and the input opening 120 or width W3 at the distal end and the output opening 130. According to some example embodiments, a maximum width W2 of the internal airflow passageway 102 (taken at point 111) may be disposed between the proximal end (e.g., at the input opening 120) or at the distal end (e.g., at the output opening 130). As such, according to some example embodiments, an internal airflow passageway width W1 at the proximal end and the internal airflow passageway width W3 at the distal end may be less than the maximum width W2 of the internal airflow passageway 102. Further, according to some example embodiments, the width W1 of the internal airflow passageway 102 at the proximal end (e.g., at the input opening 120) may be larger than the width W3 of the internal airflow passageway 102 at the distal end (e.g., at the output opening 130). Further, according to some example embodiments, a minimum width of the internal airflow passageway 102 may be located at the distal end of the internal airflow passageway 102 and the elongate body 110. Additionally, according to some example embodiments, the width W1 of the proximal end at the input opening 120 (depicted as dotted in FIG. 5B because it is not viewable from the front view) is smaller than the width W2 taken at the maximum point 111, but larger than the width W3 of the distal end at the output opening 130.

Figure 6:
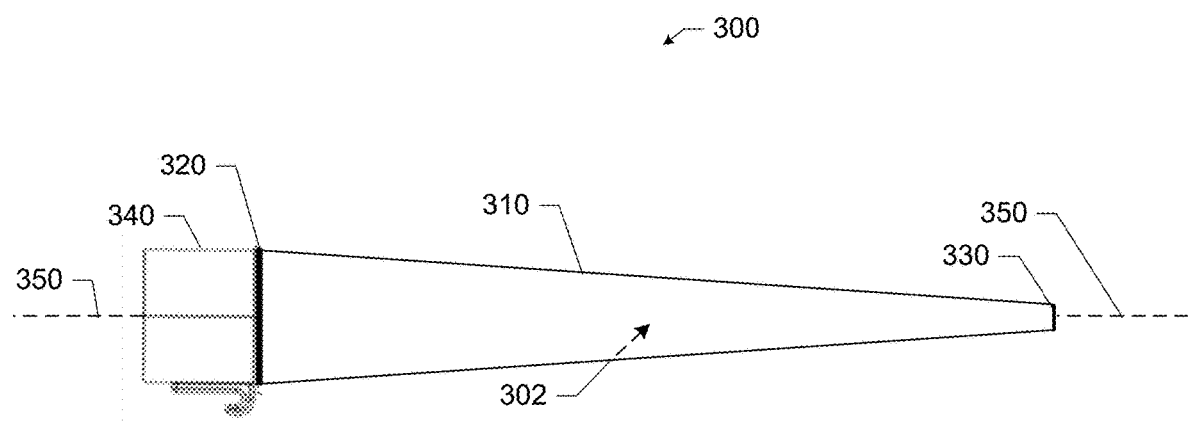
FIG. 6 illustrates another example collapsible blower extension in an expanded state according to some example embodiments.

Referring now to FIG. 6, another example embodiment of a collapsible blower extension 300 is shown. The elongate body 310 of the collapsible blower extension 300 has a different shape from the elongate body 110 of the collapsible blower extension 100, but the collapsible blower extension 300 is otherwise constructed similarly. In this regard, the elongate body 310 may be formed using the same pliable materials as the elongate body 110. Further, the elongate body 310 may comprise an input opening 320 and an output opening 330. The collapsible blower extension 100 may include a coupler 340 that is the same or similar to the coupler 140. The elongate body 310 may also be symmetrical about a central axis, i.e., central axis 350.

The shape of the elongate body 310 and the internal airflow passageway 302 of the elongate body 310 may be conical, when in the expanded state. In this regard, a width of the elongate body 310 and the internal airflow passageway of the elongate body 310 may decrease across the length of the body from the proximal end at the input opening 320 to the distal end at the output opening 330. As such, for the elongate body 310, a maximum width may be located at the proximal end and the input opening 320 and a minimum width may be located at the distal end and the output opening 330.

Additionally, because the walls of the internal airflow passageway of the elongate body 310 are not parallel, a turbulence may form with the internal airflow passageway 302 when an airflow is applied to the input opening 320 creating an increased internal air pressure. As such, the air pressure internal to the elongate body 310 may apply a force on the interior walls of the internal airflow passageway 302 that maintains the elongate body 310 and the internal airflow passageway in the expanded state while sufficient airflow is provided.

While the collapsible blower extensions 100 and 300 described herein both have circular cross-sections, input openings, and output openings, it is contemplated that collapsible blower extensions, according to some example embodiments, may have non-circular and non-symmetric cross-sections, input openings, or output openings. In this regard, FIGS. 7A, 7B, and 8A illustrate example cross-sections of elongate bodies of collapsible blower extensions, according to some example embodiments, where the cross-sections are non-circular or non-symmetric.

Figure 7A:
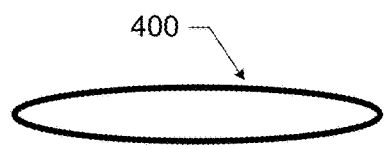
FIGS. 7A and 7B illustrate example cross-sectional front views of respective example elongate bodies of example collapsible blower extensions according to some example embodiments.
Figure 7B:
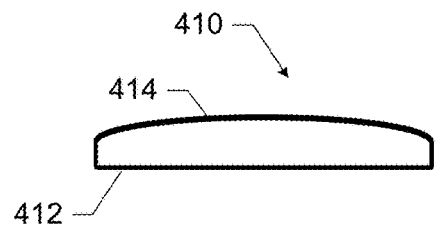

In this regard, FIG. 7A illustrates an example cross-section of an elongate body 400 of an example collapsible blower extension that is shaped as an oval. FIG. 7B illustrates another example cross-section with a non-uniform shape. In this regard, the shape of the cross-section of an elongate body 410 of an example collapsible blower extension includes a rectangular lower portion 412 and an oval-shaped upper portion 414.

Further, according to some example embodiments, a collapsible blower extension 100 may include an elongate body having more than one internal airflow passageway. In other words, according to some example embodiments, an elongate body may include one or more secondary internal airflow passageways. Such secondary internal airflow passageways may but need not extend across the entire length of the elongate body. For example, according to some example embodiments, secondary airflow passageways may extend for only a portion of the length of the elongate body either at the proximal end (adjacent the input opening) or the distal end (adjacent the output opening). Further, according to some example embodiments, secondary internal airflow passageways may be disposed within, or be part of, the interior walls of a larger main internal airflow passageway. In this regard, such secondary internal airflow passageways may have openings (e.g., slits) in the walls that form the secondary internal airflow passageways to allow airflow communication between passageways within the body (i.e., airflow communication into a main internal airflow passageway or between the secondary internal airflow passageway. Such airflow communication, according to some example embodiments, may generate a balanced pressure between passageways to generate a more consistently rigid geometry.

In this regard, the cross-section of an elongate body 420 of an example collapsible blower extension shown in FIG. 8A includes an oval-shaped structure with circular structures at the ends of the oval shape. In this regard, the elongate body 420 may be formed such that a main internal airflow passageway 422 may be disposed in between separate, isolated secondary internal airflow passageways 424 and 426. Secondary internal airflow passageways 424 and 426 may have smaller cross-sectional areas or smaller widths relative to the main internal airflow passageway 422. As such, because the secondary internal airflow passageways 424 and 426 are disposed adjacent to the external edges of the body and because air pressures formed within the secondary internal airflow passageways 424 and 426, due to their respective shapes, may be relatively higher due to the smaller cross-sectional areas, the inclusion of the secondary internal airflow passageways 424 and 426 may increase the structural strength and rigidity of the elongate body 420 of the collapsible blower extension when in the expanded state.

Similarly, FIG. 8B illustrates another cross-section of an example embodiment of a collapsible blower extension with an elongate body 430 comprising a main internal airflow passageway 432 and secondary internal airflow passageways 434. In this regard, the cross-section of the elongate body 430 shown in FIG. 8B of an example collapsible blower extension includes a circular-shaped main internal airflow passageway 432 with a plurality of circular-shaped secondary internal airflow passageways 434 disposed around the internal circumference of the main internal airflow passageway 432. The secondary internal airflow passageways 434 may extend for the length of the elongate body 430 (i.e., from the input opening to the output opening) or, according to some example embodiments, the secondary internal airflow passageways 434 may be disposed across only a portion of the length of the body (e.g., adjacent the distal end at the output opening). Similarly, because the secondary internal airflow passageways 434 are disposed adjacent to the external edges of the body and because air pressures formed within the secondary internal airflow passageways 434 due to their shape may be relatively higher due to the smaller cross-sectional areas, the inclusion of the secondary internal airflow passageways 434 may again increase the structural strength and rigidity of the body of the collapsible blower extension when in the expanded state.

FIG. 8C illustrates another cross-section of an example embodiment of a collapsible blower extension with an elongate body 440 comprising a main internal airflow passageway 442 and secondary internal airflow passageways 444 and 446. In this regard, the cross-section of the elongate body 440 shown in FIG. 8C of an example collapsible blower extension includes a circular-shaped main internal airflow passageway 442 with secondary internal airflow passageways 444 and 446 disposed on either side of the main internal airflow passageway 442. In this regard, the width of the cross-sections of each of the main internal airflow passageway 442, the secondary internal airflow passageway 444, and the secondary internal airflow passageway 446 may be the same or substantially the same. In this example embodiment, the cross-sectional shape of the main internal airflow passageway 442, the secondary internal airflow passageway 444, and the secondary internal airflow passageway 446 may be circular, and therefore the cross-sectional area of the main internal airflow passageway 442, the secondary internal airflow passageway 444, and the secondary internal airflow passageway 446 may be same or substantially the same. The positional orientation of the main internal airflow passageway 442, the secondary internal airflow passageway 444, and the secondary internal airflow passageway 446 in FIG. 8C is side-by-side, however, the passageway may be positioned in any number of positional orientations, such as, for example, in a triangular orientation where a portion of the walls of each of the passageways are in contact with each other two passageways. As described above, each of the passageways may have non-parallel walls that operate to generate an internal air pressure within the passageways.

Referring now to FIG. 9A, another example collapsible blower extension 500 is provided that includes an auto-storage feature such that, in the collapsed state, the elongate body 510 is automatically stored and does not remain extended away from the working assembly. In this regard, according to some example embodiments, a collapsible blower extension 500 may be configured to automatically retract, recoil, condense, or the like when in the collapsed state. The collapsible blower extension 500 is one example where the elongate body recoils to the working assembly to perform an auto-rollup feature. The collapsible blower extension 500 is otherwise similar to the collapsible blower extension 100.

In this regard, when sufficient airflow is passing through the internal airflow passageway 502, the body 510 may be in the expanded state as shown in FIG. 9A. However, when airflow through the internal airflow passageway 502 ceases, a spring member 550 (e.g., a spiral spring member) may cause the pliable material of the body 510 to roll or recoil from the distal end at the output opening 530 into a spiral towards the proximal end at the input opening 520 and the coupler 540. The body 510 of the collapsible blower extension 500 may therefore collapse and then, since the forces created by the airflow into the internal airflow passageway 502 are no longer present, roll into a stored position as shown in FIG. 9C. In other words, the spring member 550 (e.g., spiral spring member) may be configured to urge the elongate body 510 into a spirally-rolled configuration when the internal airflow passageway 502 is collapsed.

In this regard, the collapsible blower extension 500 may include a spring member 550 that extends the length of the body 510. The spring member 550 may be formed of steel or the like, which may be constructed such that the spring member 550, for example, generates a mechanical bias to cause the spring to curl into a spiral when external forces are not applied to the spring member 550. According to some example embodiments, a cross-section of the spring member 550 is shown in FIG. 9B as having a curved profile with a minimum point 552 in a central location and higher points 554 at either ends of the curved profile. Such a curved profile may increase the rigidity of the spring member 550 when unrolled and extended. While the spring member 550 is shown in FIG. 9B with a curved profile, a spring member having a non-curved or flat profile may also be used according to some example embodiments.

The spring member 550 may be disposed into a lengthwise extending pocket 570 formed, for example, by a pliable material strip 560 sewn or formed on an internal or external surface of the elongate body 510. The pocket 570 may extend a length of the body 510 from the input opening 520 to the output opening 530 and the spring member 550 may be disposed in the pocket 570 and extend the length of the pocket 570. According to some example embodiments, the spring member 550 may be disposed within the pocket 570 without otherwise being attached to the body 510.

According to some example embodiments, a collapsible blower extension with an alternative auto-storage feature may be configured to extend axially away from the airflow outlet of the working assembly when airflow is provided to the body, and then axially retract towards to the airflow outlet of the working assembly when the airflow is stopped. In this regard, for example, a bellows-type structure may be implemented with an accordion-type pleats to permit the body to extend when the airflow is applied and retract via the pleats, and possibly an internal spring member, when the airflow is ceased.

Now referring to FIG. 10A, a flowchart of an example method for implementing a collapsible blower extension is provided. With respect to some of the operations of the example method, reference will also be made to the image flow FIG. 10B, which illustrates a collapsible blower extension transitioning from a collapsed state and stored to an expanded state.

In this regard, the example method may include, at 600, collapsing a collapsible blower extension of a leaf blower that is operably coupled to a working assembly airflow outlet of the leaf blower. In this regard, the collapsible blower extension may comprise an elongate body forming an internal airflow passageway having an input opening at a proximal end of the elongate body proximate the working assembly airflow outlet and an output opening at a distal end of the elongate body. According to some example embodiments, the elongate body may be formed of a pliable material.

According to some example embodiments, the example method may also include, at 610, storing the collapsible blower extension within the working assembly airflow outlet. Storing may include bunching, rolling, stuffing, or otherwise inserting, the collapsed blower extension into a cavity such as the working assembly airflow outlet. In this regard, the image 700 shows an image of an example leaf blower is shown where a collapsible blower extension has been stored (e.g., inserted) into the airflow outlet of the working assembly of the leaf blower.

At 620, the example method may include generating, by the leaf blower, an airflow from the working assembly airflow outlet into the input opening of the internal airflow passageway of the collapsible blower extension to create an internal air pressure within the internal airflow passageway to transition the collapsible blower extension from a collapsed state to an expanded state. To generate such an airflow, a user may start a motor of the working assembly of the leaf blower. As shown in image 700, a user is prepared to pull a starter cord to start a motor that is an internal combustion engine. As shown in image 710, once the motor begins running and an impeller begins turning to generate the airflow, the elongate body of the collapsible blower extension may be forced out of the airflow outlet of the working assembly by the airflow, and elongate body of the collapsible blower extension may begin into inflate into the expanded state. As shown in image 720, the airflow exiting the airflow outlet has reached a velocity that creates sufficient air pressure within the internal airflow passageway of the elongate body of the collapsible blower extension to transition the collapsible blower extension to the expanded state and maintain the collapsible blower extension in the expanded state.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A leaf blower comprising:
    a working assembly comprising a motor and an impeller, the motor being operably coupled to the impeller to rotate the impeller and generate an airflow through a working assembly airflow outlet; and
    a collapsible blower extension operably coupled to the outlet of the working assembly, the collapsible blower extension comprising an elongate body forming an internal airflow passageway having an input opening at a proximal end of the elongate body proximate the working assembly airflow outlet and an output opening at a distal end of the elongate body, the elongate body being formed of a pliable material causing the internal airflow passageway to be collapsible,
    wherein a maximum width of the internal airflow passageway is disposed between the proximal end and the distal end, and wherein an internal airflow passageway width at the proximal end and an internal airflow passageway width at the distal end are less than the maximum width of the internal airflow passageway, and
    wherein the width of the internal airflow passageway at the distal end is less than the width of the internal airflow passageway at the proximal end.

2. The leaf blower of claim 1, wherein a shape of the elongate body is configured to create an internal air pressure within the internal airflow passageway due to the airflow from the working assembly airflow outlet to transition the internal airflow passageway from a collapsed state to an expanded state;
    wherein, in the expanded state, airflow from the working assembly airflow outlet passes through the internal airflow passageway and out of the output opening of the elongate body.

3. The leaf blower of claim 1, wherein a width of the internal airflow passageway varies along a length of the elongate body from the proximal end to the distal end.

4. The leaf blower of claim 1, wherein a width of the internal airflow passageway at the distal end is a minimum width of the internal airflow passageway.

5. The leaf blower of claim 1, wherein the pliable material comprises a fabric or a latex.

6. A leaf blower comprising:
    a working assembly comprising a motor and an impeller, the motor being operably coupled to the impeller to rotate the impeller and generate an airflow through a working assembly airflow outlet; and
    a collapsible blower extension operably coupled to the outlet of the working assembly, the collapsible blower extension comprising an elongate body forming an internal airflow passageway having an input opening at a proximal end of the elongate body proximate the working assembly airflow outlet and an output opening at a distal end of the elongate body, the elongate body being formed of a pliable material causing the internal airflow passageway to be collapsible, wherein the elongate body comprises a secondary internal airflow passageway, a width of the secondary internal airflow passageway being less than a width of the internal airflow passageway.

7. A leaf blower comprising:

a working assembly comprising a motor and an impeller, the motor being operably coupled to the impeller to rotate the impeller and generate an airflow through a working assembly airflow outlet; and a collapsible blower extension operably coupled to the outlet of the working assembly, the collapsible blower extension comprising an elongate body forming an internal airflow passageway having an input opening at a proximal end of the elongate body proximate the working assembly airflow outlet and an output opening at a distal end of the elongate body, the elongate body being formed of a pliable material causing the internal airflow passageway to be collapsible, wherein the elongate body is storable within the working assembly airflow outlet.

8. A leaf blower comprising:

a working assembly comprising a motor and an impeller, the motor being operably coupled to the impeller to rotate the impeller and generate an airflow through a working assembly airflow outlet; and a collapsible blower extension operably coupled to the outlet of the working assembly, the collapsible blower extension comprising an elongate body forming an internal airflow passageway having an input opening at a proximal end of the elongate body proximate the working assembly airflow outlet and an output opening at a distal end of the elongate body, the elongate body being formed of a pliable material causing the internal airflow passageway to be collapsible, wherein the elongate body further comprises a spiral spring member disposed within a lengthwise extending pocket of the elongate body, wherein the spiral spring member is configured to urge the elongate body into a spirally-rolled configuration when the internal airflow passageway is collapsed.

9. A collapsible blower extension for a leaf blower comprising:

an elongate body forming an internal airflow passageway, the elongate body being formed of a pliable material causing the internal airflow passageway to be collapsible;

an input opening at a proximal end of the elongate body configured to be disposed proximate a leaf blower working assembly airflow outlet; and an output opening at a distal end of the elongate body, wherein a maximum width of the internal airflow passageway is disposed between the proximal end and the distal end, and wherein an internal airflow passageway width at the proximal end and an internal airflow passageway width at the distal end are less than the maximum width of the internal airflow passageway, and wherein the width of the internal airflow passageway at the distal end is less than the width of the internal airflow passageway at the proximal end.

10. The collapsible blower extension of claim 9, wherein a shape of the elongate body is configured to create an internal air pressure within the internal airflow passageway due to the airflow from the leaf blower working assembly airflow outlet to transition the collapsible blower extension from a collapsed state to an expanded state;

wherein, in the expanded state, airflow from the leaf blower working assembly airflow outlet passes through the internal airflow passageway and out of the output opening of the elongate body.

11. The collapsible blower extension of claim 9, wherein a width of the internal airflow passageway varies along a length of the elongate body from the proximal end to the distal end.

12. The collapsible blower extension of claim 9, wherein a width of the internal airflow passageway at the distal end is a minimum width of the internal airflow passageway.

13. A collapsible blower extension for a leaf blower comprising:

an elongate body forming an internal airflow passageway, the elongate body being formed of a pliable material causing the internal airflow passageway to be collapsible;

an input opening at a proximal end of the elongate body configured to be disposed proximate a leaf blower working assembly airflow outlet; and an output opening at a distal end of the elongate body, wherein the elongate body comprises a secondary internal airflow passageway, a width of the secondary internal airflow passageway being less than or substantially equal to a width of the internal airflow passageway.

14. A collapsible blower extension for a leaf blower comprising:

an elongate body forming an internal airflow passageway, the elongate body being formed of a pliable material causing the internal airflow passageway to be collapsible;

an input opening at a proximal end of the elongate body configured to be disposed proximate a leaf blower working assembly airflow outlet; and an output opening at a distal end of the elongate body, wherein the elongate body further comprises a spiral spring member disposed within a lengthwise extending pocket of the elongate body, wherein the spiral spring member is configured to urge the elongate body into a spirally-rolled configuration when the internal airflow passageway is collapsed.

15. A method comprising:

collapsing a collapsible blower extension of a leaf blower that is operably coupled to a working assembly airflow outlet of the leaf blower, the collapsible blower extension comprising an elongate body forming an internal airflow passageway having an input opening at a proximal end of the elongate body proximate the working assembly airflow outlet and an output opening at a distal end of the elongate body, the elongate body being formed of a pliable material;

generating, by the leaf blower, an airflow from the working assembly airflow outlet into the input opening of the internal airflow passageway to create an internal air pressure within the internal airflow passageway to transition the collapsible blower extension from a collapsed state to an expanded state; and storing the collapsible blower extension within the working assembly airflow outlet.

* * * * *